W. F. MINNICK.
PISTON.
APPLICATION FILED JAN. 10, 1917.
1,255,036.
Patented Jan. 29, 1918.
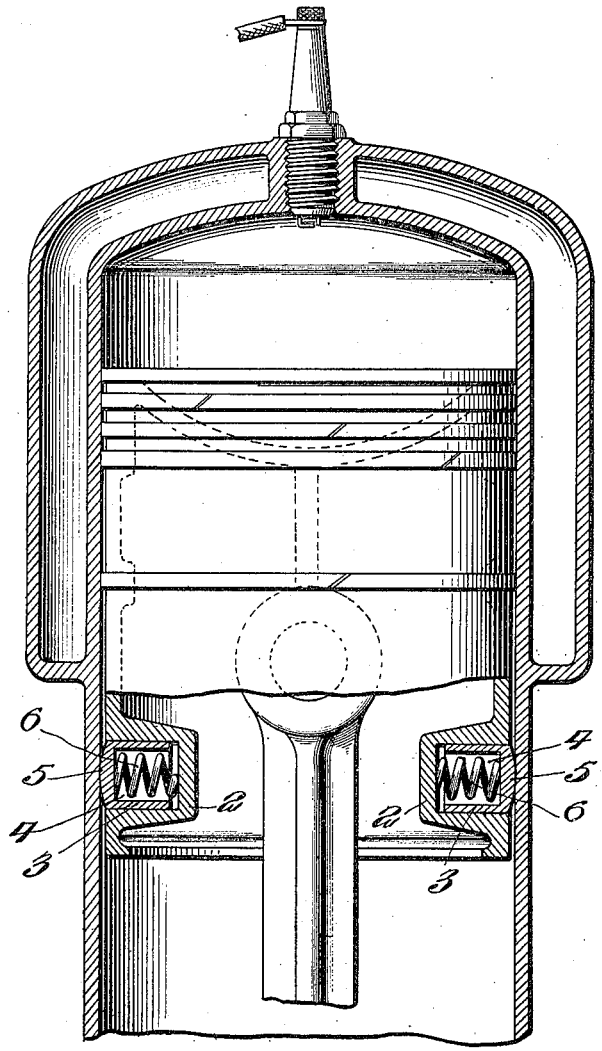
Inventor
W. F. Minnick.

UNITED STATES PATENT OFFICE.

WILLIAM F. MINNICK, OF CLEVELAND, OHIO.

PISTON.

1,255,036.  Specification of Letters Patent.  Patented Jan. 29, 1918.

Application filed January 10, 1917. Serial No. 141,687.

*To all whom it may concern:*

Be it known that I, WILLIAM F. MINNICK, of Cleveland, in the county of Cuyahoga and State of Ohio, have invented certain new and useful Improvements in Pistons; and I do hereby declare the following to be a full, clear, and exact description of the invention, such as will enable others skilled in the art to which it appertains to make and use the same.

My object is to provide an engine piston with means for effecting a yielding contact with its cylinder to insure an even stroke. It is well known that if the piston is of too small diameter the piston cants causing a slap and possible injury to the cylinder, while if the piston becomes too large, due to expansion, both it and the cylinder will be scored or abraded.

I have illustrated my invention in the accompanying drawing, the view being a vertical longitudinal sectional view of portion of a piston equipped with my improvements.

As illustrated I form the piston at diametrically opposite points in its periphery with radial recesses 2, these recesses being disposed transversely of the pivotal connection between the piston and its rod. Seated in each of the recesses is a friction device 3 adapted to insure effective or yielding contact with a cylinder wall. Each of these friction devices is shown comprising a hollow and substantially cup-shaped plunger 4 having its outer face convex as at 5 and containing a coiled spring 6 bearing against the inner face of the end of the friction device and against the end wall of the recess and tending to force the friction piece outward radially from the piston. In the position of the parts illustrated it will be noted that the outer surface 5 is beyond the periphery of the piston.

By this means a contact is insured between the piston and the cylinder wall and one which yields and in consequence compensates for varying diameters preventing canting of the piston and avoiding noise or scraping of the cylinder wall.

My invention is especially adapted to engines having their pistons made of aluminum or alloy metals whose expansion is greater than that of cast iron. Furthermore it makes provision for the expansion and contraction due to the variation in the temperature of the piston in operation. It will of course be understood that suitable piston rings may be employed at the proper point on the top of the piston, my improvement being adapted for use at a point below the rings. I insure an even and silent movement by allowing clearance at all points other than where the piston rings contact with the cylinder wall, and at points of my device.

The advantages of my invention will be apparent. It is to be noted that by providing the piston with means for effecting a yielding contact with its cylinder I am enabled to turn the piston down to a size where expansion is taken care of, obviating machining operations; also that less lubricant is required because of the spaced relation between the piston and the cylinder walls and that such space allows a return of the lubricant which would otherwise be burned, thus mitigating smoke nuisance.

I claim as my invention:

1. In combination with a piston and its rod, a friction device carried by said piston comprising a member movable radially with relation to the latter and its cylinder, said member being disposed transversely of the pivotal connection between the piston and its rod, and a spring tending to hold said member projected into contact with the cylinder.

2. As an article or manufacture a piston having radially disposed recesses, friction elements within said recesses adapted to be projected into engagement with the walls of a cylinder, said friction elements having their outer or contact surfaces convex and springs tending to hold said elements projected.

In testimony whereof, I have signed this specification in the presence of two subscribing witnesses.

WILLIAM F. MINNICK.

Witnesses:
  ALBERT E. KOECKERT,
  C. E. COWLEY.